(12) United States Patent
Maity et al.

(10) Patent No.: US 9,240,924 B2
(45) Date of Patent: Jan. 19, 2016

(54) OUT-OF BAND REPLICATING BIOS SETTING DATA ACROSS COMPUTERS

(71) Applicant: AMERICAN MEGATRENDS, INC., Norcross, GA (US)

(72) Inventors: Sanjoy Maity, Snellville, GA (US); Baskar Parthiban, Johns Creek, GA (US); Satheesh Thomas, Norcross, GA (US); Purandhar Nallagatla, Johns Creek, GA (US); Harikrishna Doppalapudi, Norcross, GA (US); Ramakoti Reddy Bhimanadhuni, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 358 days.

(21) Appl. No.: 14/025,935

(22) Filed: Sep. 13, 2013

(65) Prior Publication Data

US 2015/0081829 A1    Mar. 19, 2015

(51) Int. Cl.
*H04L 12/24* (2006.01)
*G06F 9/00* (2006.01)

(52) U.S. Cl.
CPC ............... *H04L 41/082* (2013.01); *G06F 9/00* (2013.01)

(58) Field of Classification Search
None
See application file for complete search history.

(56) References Cited

U.S. PATENT DOCUMENTS

| | | | | |
|---|---|---|---|---|
| 7,000,101 B2* | 2/2006 | Wu | ............ | G06F 8/65 713/1 |
| 7,143,279 B2* | 11/2006 | Goud | ............ | G06F 8/65 713/1 |
| 7,421,688 B1* | 9/2008 | Righi | ............ | H04L 67/34 709/202 |
| 7,797,526 B2* | 9/2010 | Boyle | ............ | G06F 8/65 713/1 |
| 2003/0120913 A1* | 6/2003 | Wu | ............ | G06F 8/65 713/100 |
| 2004/0243798 A1* | 12/2004 | Goud | ............ | G06F 8/65 713/100 |
| 2007/0055968 A1* | 3/2007 | Rader | ............ | G06F 8/65 717/168 |
| 2007/0288737 A1* | 12/2007 | Boyle | ............ | G06F 8/65 713/1 |
| 2010/0228960 A1* | 9/2010 | Huang | ............ | G06F 8/65 713/100 |
| 2012/0239981 A1* | 9/2012 | Franke | ............ | G06F 11/368 714/38.1 |

* cited by examiner

*Primary Examiner* — Edward Dudek, Jr.
*Assistant Examiner* — Christopher D Birkhimer
(74) *Attorney, Agent, or Firm* — Locke Lord LLP; Tim Tingkang Xia, Esq.

(57) ABSTRACT

Certain aspects of the present disclosure relate to a system for replicating BIOS setting data (BIOSSD) across computers. The system includes a plurality of computers, and each computer is connected to a service processor (SP). Each computer includes a BIOS chip, which stores a first BIOSSD collection. The SP stores a second BIOSSD collection. When the first BIOSSD collection is newer, the SP receives a copy of the first BIOSSD collection from the computer to replace the second BIOSSD collection. When the second BIOSSD collection is newer, the SP transmits a copy of the second BIOSSD collection to the computer to replace the first BIOSSD collection in the BIOS chip. A remote management may request and obtain from the SP the updated second BIOSSD collection such that the remote management computer may send the copy the updated second BIOSSD collection to other SP's for update.

27 Claims, 10 Drawing Sheets

OUT-OF BAND REPLICATING BIOS SETTING DATA ACROSS COMPUTERS

FIELD

The present disclosure relates generally to updating basic input/output system (BIOS) setting data, and particularly to system and method for out-of-band (OOB) replicating BIOS setting data across a plurality of computers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Basic Input/Output System (BIOS) is one of the most crucial components on a computer motherboard. The BIOS software is preloaded into a memory (the BIOS memory) of the BIOS, and typically is the first code run by a computer when powered on. When the computer starts up, the first job for the BIOS is the power-on self-test, which initializes and identifies the system devices such as the CPU, RAM, video display card, keyboard and mouse, hard disk drive, optical disc drive and other hardware. The BIOS then locates a boot loader software held on a peripheral device (designated as a "boot device"), such as a hard disk or a CD/DVD, and loads and executes that software, giving it control of the operating system (OS). This process is known as booting, or booting up, which is short for bootstrapping.

Generally, the BIOS may have a number of settings that can be configured by a user of the computer. For a system having a plurality of computers with similar settings, there is a need to copy the BIOS settings across the computers. However, each computer in the system may be in a different operational state. For example, when the user attempts to copy the BIOS settings from one computer of the system to a target computer of the system, the target computer may be powered off such that the BIOS settings cannot be updated.

Therefore, an unaddressed need exists in the art to address the aforementioned deficiencies and inadequacies.

SUMMARY

Certain aspects of the present disclosure relate to a system for replicating BIOS setting data (BIOSSD) across computers. In certain embodiments, the system includes: a plurality of computers, each including a BIOS chip, wherein the BIOS chip stores a first BIOSSD collection; a plurality of service processors (SP's), each connecting to one of the plurality of computers via an interface, each SP including a processor and a non-volatile memory storing computer executable codes and a second BIOSSD collection; and a remote management computer connected to the plurality of SP's via a network. The codes are configured, when executed at the processor, to: when the first BIOSSD collection is newer than the second BIOSSD collection, receive a copy of the first BIOSSD collection from the BIOS chip through the interface, and replace the second BIOSSD collection with the copy of the first BIOSSD collection received from the BIOS chip; when the second BIOSSD collection is newer than the first BIOSSD collection, transmit a copy of the second BIOSSD collection to the BIOS chip through the interface to replace the first BIOSSD collection in the BIOS chip; in response to a request for from the remote management computer, transmit the copy of the second BIOSSD collection to the remote management computer via the network; and receive a copy of a third BIOSSD collection from the remote management computer via the network, and replace the second BIOSSD collection with the copy of the third BIOSSD collection.

In certain embodiments, the BIOS chip stores a BIOS, configured to compare version information of the first BIOSSD collection and the second BIOSSD collection to determine whether the first BIOSSD collection is newer or not newer than the second BIOSSD collection.

In certain embodiments, the interface is a keyboard controller style (KCS) interface. In certain embodiments, the codes include a BIOSSD update module, configured to: when the first BIOSSD collection is newer than the second BIOSSD collection, receive the copy of the first BIOSSD collection from the BIOS chip through the KCS interface, and replace the second BIOSSD collection with the copy of the first BIOSSD collection received from the BIOS chip; and when the second BIOSSD collection is newer than the first BIOSSD collection, transmit the copy of the second BIOSSD collection to the BIOS chip through the KCS interface to replace the first BIOSSD collection in the BIOS chip.

In certain embodiments, the BIOSSD update module is configured to: receive a first Intelligent Platform Management Interface (IPMI) original equipment manufacturer (OEM) message from the BIOS chip, wherein the first IPMI OEM message comprises a version request for version information of the second BIOSSD collection; and in response to the version request, send a second IPMI OEM message to the BIOS chip, wherein the second IPMI OEM message comprises the version information of the second BIOSSD collection.

In certain embodiments, the BIOSSD update module is further configured to: when the first BIOSSD collection is newer than the second BIOSSD collection, receive a third IPMI OEM message from the BIOS chip, wherein the third IPMI OEM message comprises the copy of the first BIOSSD collection from the BIOS chip, and replace the second BIOSSD collection with the copy of the first BIOSSD collection in the third IPMI OEM message; and when the second BIOSSD collection is newer than the first BIOSSD collection, receive a fourth IPMI OEM message from the BIOS chip, wherein the fourth IPMI OEM message comprises a copy request for the copy of the second BIOSSD collection, and in response to the copy request, transmit a fifth IPMI OEM message to the BIOS chip, wherein the fifth IPMI OEM message comprises the copy of the second BIOSSD collection.

In certain embodiments, the interface is a universal serial bus (USB) interface. In certain embodiments, the codes include a USB emulation module configured to emulate a virtual USB drive corresponding to the second BIOSSD collection stored in the non-volatile memory of the SP.

In certain embodiments, the USB emulation module is configured to: receive, from the BIOS chip, a version request to retrieve the version information of the second BIOSSD collection of the virtual USB drive; and in response to the version request, send the version information of the second BIOSSD collection to the BIOS chip.

In certain embodiments, the USB emulation module is further configured to: when the first BIOSSD collection is newer than the second BIOSSD collection, receive, from the BIOS chip, a copy of the first BIOSSD collection to be stored in the virtual USB drive, and replace the second BIOSSD collection with the copy of the first BIOSSD collection received from the BIOS chip; and when the second BIOSSD collection is newer than the first BIOSSD collection, receive, from the BIOS chip, a retrieving request for the copy of the second BIOSSD collection from the virtual USB drive, and in response to the retrieving request, transmit a the copy of the second BIOSSD collection to the BIOS chip.

In certain embodiments, the SP is a baseboard management controller (BMC).

Certain aspects of the present disclosure relate to a SP, which is connected to a computer via an interface, where the computer includes a BIOS chip, and the BIOS chip stores a first BIOSSD collection. The SP includes a processor and a non-volatile memory storing computer executable codes and a second BIOSSD collection. The codes are configured, when executed at the processor, to when the first BIOSSD collection is newer than the second BIOSSD collection, receive a copy of the first BIOSSD collection from the BIOS chip through the interface, and replace the second BIOSSD collection with the copy of the first BIOSSD collection received from the BIOS chip; when the BIOSSD collection is newer than a first BIOSSD collection stored in a BIOS chip of a computer connected to the SP via an interface, transmit a copy of the second BIOSSD collection to the BIOS chip through the interface to replace the first BIOSSD collection in the BIOS chip; in response to a request for from a remote management computer connected to the SP via a network, transmit the copy of the second BIOSSD collection to the remote management computer via the network; and receive a copy of a third BIOSSD collection from the remote management computer via the network, and replace the second BIOSSD collection with the copy of the third BIOSSD collection.

In certain embodiments, the interface is a keyboard controller style (KCS) interface. In certain embodiments, the codes include a BIOSSD update module, configured to: when the first BIOSSD collection is newer than the second BIOSSD collection, receive the copy of the first BIOSSD collection from the BIOS chip through the KCS interface, and replace the second BIOSSD collection with the copy of the first BIOSSD collection received from the BIOS chip; and when the second BIOSSD collection is newer than the first BIOSSD collection, transmit the copy of the second BIOSSD collection to the BIOS chip through the KCS interface to replace the first BIOSSD collection in the BIOS chip.

In certain embodiments, the BIOSSD update module is configured to: receive a first Intelligent Platform Management Interface (IPMI) original equipment manufacturer (OEM) message from the BIOS chip, wherein the first IPMI OEM message comprises a version request for version information of the second BIOSSD collection; in response to the version request, send a second IPMI OEM message to the BIOS chip, wherein the second IPMI OEM message comprises the version information of the second BIOSSD collection; when the first BIOSSD collection is newer than the second BIOSSD collection, receive a third IPMI OEM message from the BIOS chip, wherein the third IPMI OEM message comprises the copy of the first BIOSSD collection from the BIOS chip, and replace the second BIOSSD collection with the copy of the first BIOSSD collection in the third IPMI OEM message; and when the second BIOSSD collection is newer than the first BIOSSD collection, receive a fourth IPMI OEM message from the BIOS chip, wherein the fourth IPMI OEM message comprises a copy request for the copy of the second BIOSSD collection, and in response to the copy request, transmit a fifth IPMI OEM message to the BIOS chip, wherein the fifth IPMI OEM message comprises the copy of the second BIOSSD collection.

In certain embodiments, the interface is a universal serial bus (USB) interface. In certain embodiments, the codes include a USB emulation module configured to emulate a virtual USB drive corresponding to the second BIOSSD collection stored in the non-volatile memory of the SP.

In certain embodiments, the USB emulation module is configured to: receive, from the BIOS chip, a version request to retrieve the version information of the second BIOSSD collection of the virtual USB drive; in response to the version request, send the version information of the second BIOSSD collection to the BIOS chip; when the first BIOSSD collection is newer than the second BIOSSD collection, receive, from the BIOS chip, a copy of the first BIOSSD collection to be stored in the virtual USB drive, and replace the second BIOSSD collection with the copy of the first BIOSSD collection received from the BIOS chip; and when the second BIOSSD collection is newer than the first BIOSSD collection, receive, from the BIOS chip, a retrieving request for the copy of the second BIOSSD collection from the virtual USB drive, and in response to the retrieving request, transmit a the copy of the second BIOSSD collection to the BIOS chip.

In certain embodiments, the SP is a BMC.

Certain aspects of the present disclosure relate to a computer, which includes a BIOS chip, an interface, and a SP connected to the computer via the interface. The BIOS chip stores a BIOS and a first BIOSSD collection. The SP includes a processor and a non-volatile memory storing computer executable codes and a second BIOSSD collection. The codes are configured, when executed at the processor, to: when the first BIOSSD collection is newer than the second BIOSSD collection, receive a copy of the first BIOSSD collection from the BIOS chip through the interface, and replace the second BIOSSD collection with the copy of the first BIOSSD collection received from the BIOS chip; when the BIOSSD collection is newer than a first BIOSSD collection stored in a BIOS chip of a computer connected to the SP via an interface, transmit a copy of the second BIOSSD collection to the BIOS chip through the interface to replace the first BIOSSD collection in the BIOS chip; in response to a request for from a remote management computer connected to the SP via a network, transmit the copy of the second BIOSSD collection to the remote management computer via the network; and receive a copy of a third BIOSSD collection from the remote management computer via the network, and replace the second BIOSSD collection with the copy of the third BIOSSD collection.

In certain embodiments, the interface is a keyboard controller style (KCS) interface. In certain embodiments, the codes include a BIOSSD update module, configured to: when the first BIOSSD collection is newer than the second BIOSSD collection, receive the copy of the first BIOSSD collection from the BIOS chip through the KCS interface, and replace the second BIOSSD collection with the copy of the first BIOSSD collection received from the BIOS chip; and when the second BIOSSD collection is newer than the first BIOSSD collection, transmit the copy of the second BIOSSD collection to the BIOS chip through the KCS interface to replace the first BIOSSD collection in the BIOS chip.

In certain embodiments, the BIOSSD update module is configured to: receive a first Intelligent Platform Management Interface (IPMI) original equipment manufacturer (OEM) message from the BIOS chip, wherein the first IPMI OEM message comprises a version request for version information of the second BIOSSD collection; in response to the version request, send a second IPMI OEM message to the BIOS chip, wherein the second IPMI OEM message comprises the version information of the second BIOSSD collection; when the first BIOSSD collection is newer than the second BIOSSD collection, receive a third IPMI OEM message from the BIOS chip, wherein the third IPMI OEM message comprises the copy of the first BIOSSD collection from the BIOS chip, and replace the second BIOSSD collection with the copy of the first BIOSSD collection in the third IPMI OEM message; and when the second BIOSSD collection is newer than the first BIOSSD collection, receive a fourth IPMI OEM message from the BIOS chip, wherein the fourth IPMI OEM message comprises a copy request for the copy of the second BIOSSD collection, and in response to the copy request, transmit a fifth IPMI OEM message to the BIOS chip, wherein the fifth IPMI OEM message comprises the copy of the second BIOSSD collection.

In certain embodiments, the interface is a universal serial bus (USB) interface. In certain embodiments, the codes include a USB emulation module configured to emulate a virtual USB drive corresponding to the second BIOSSD collection stored in the non-volatile memory of the SP.

In certain embodiments, the USB emulation module is configured to: receive, from the BIOS chip, a version request to retrieve the version information of the second BIOSSD collection of the virtual USB drive; in response to the version request, send the version information of the second BIOSSD collection to the BIOS chip; when the first BIOSSD collection is newer than the second BIOSSD collection, receive, from the BIOS chip, a copy of the first BIOSSD collection to be stored in the virtual USB drive, and replace the second BIOSSD collection with the copy of the first BIOSSD collection received from the BIOS chip; and when the second BIOSSD collection is newer than the first BIOSSD collection, receive, from the BIOS chip, a retrieving request for the copy of the second BIOSSD collection from the virtual USB drive, and in response to the retrieving request, transmit a the copy of the second BIOSSD collection to the BIOS chip.

In certain embodiments, the SP is a BMC.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
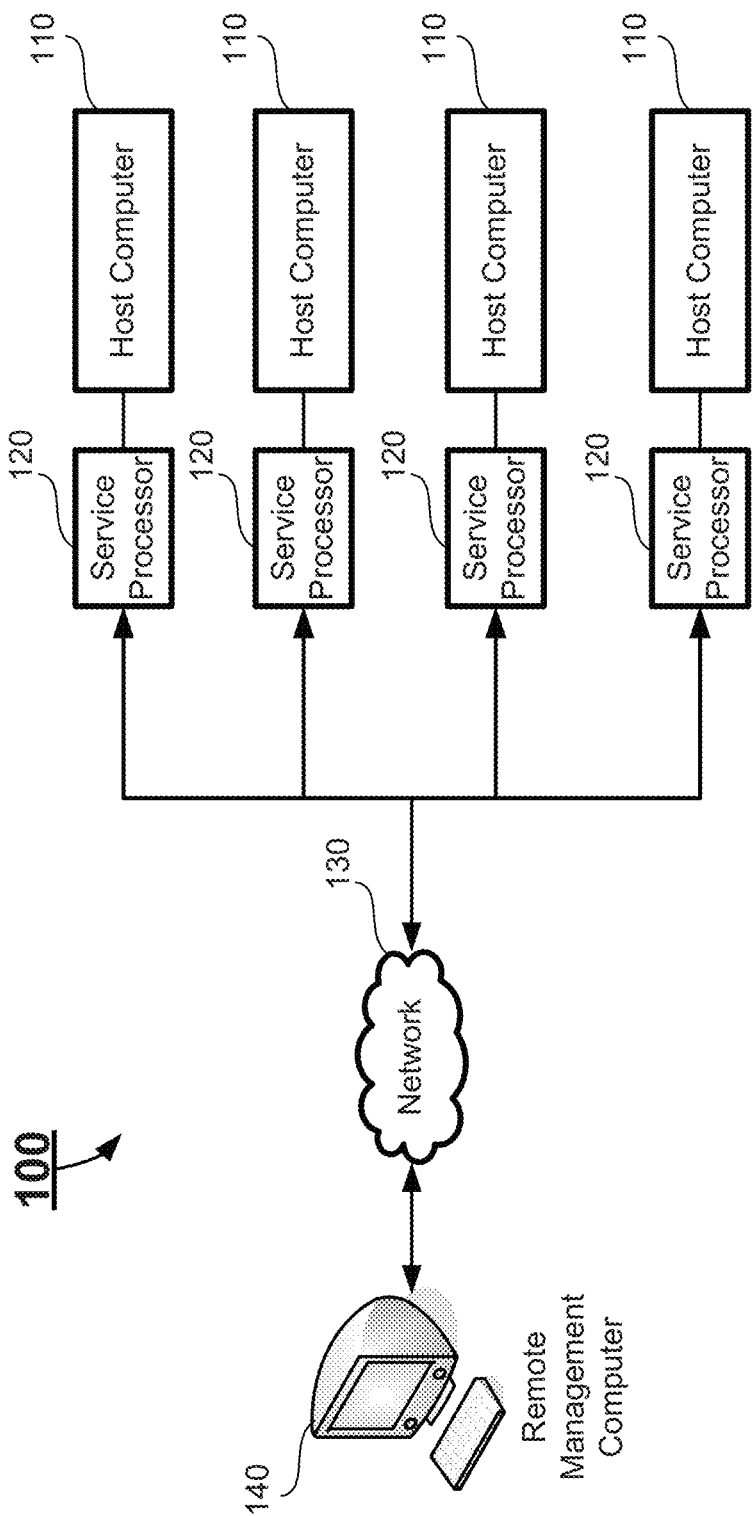
FIG. 1 schematically depicts a client-server system having a plurality of host computers according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a client-server system according to certain embodiments of the present disclosure. As shown in FIG. 1, the system 100 includes one or more host computers 110, and each host computer 110 has a service processor (SP) 120. The SP 120 of each host computer 110 is respectively connected to a remote management computer 140 via a network 130. The system 100 can be a system that incorporates more than one interconnected system, such as a client-server network. The network 130 may be a wired or wireless network, and may be of various forms such as a local area network (LAN) or wide area network (WAN) including the Internet. In certain embodiments, the system 100 may include other physical or virtual components not shown in FIG. 1.

Figure 2A:
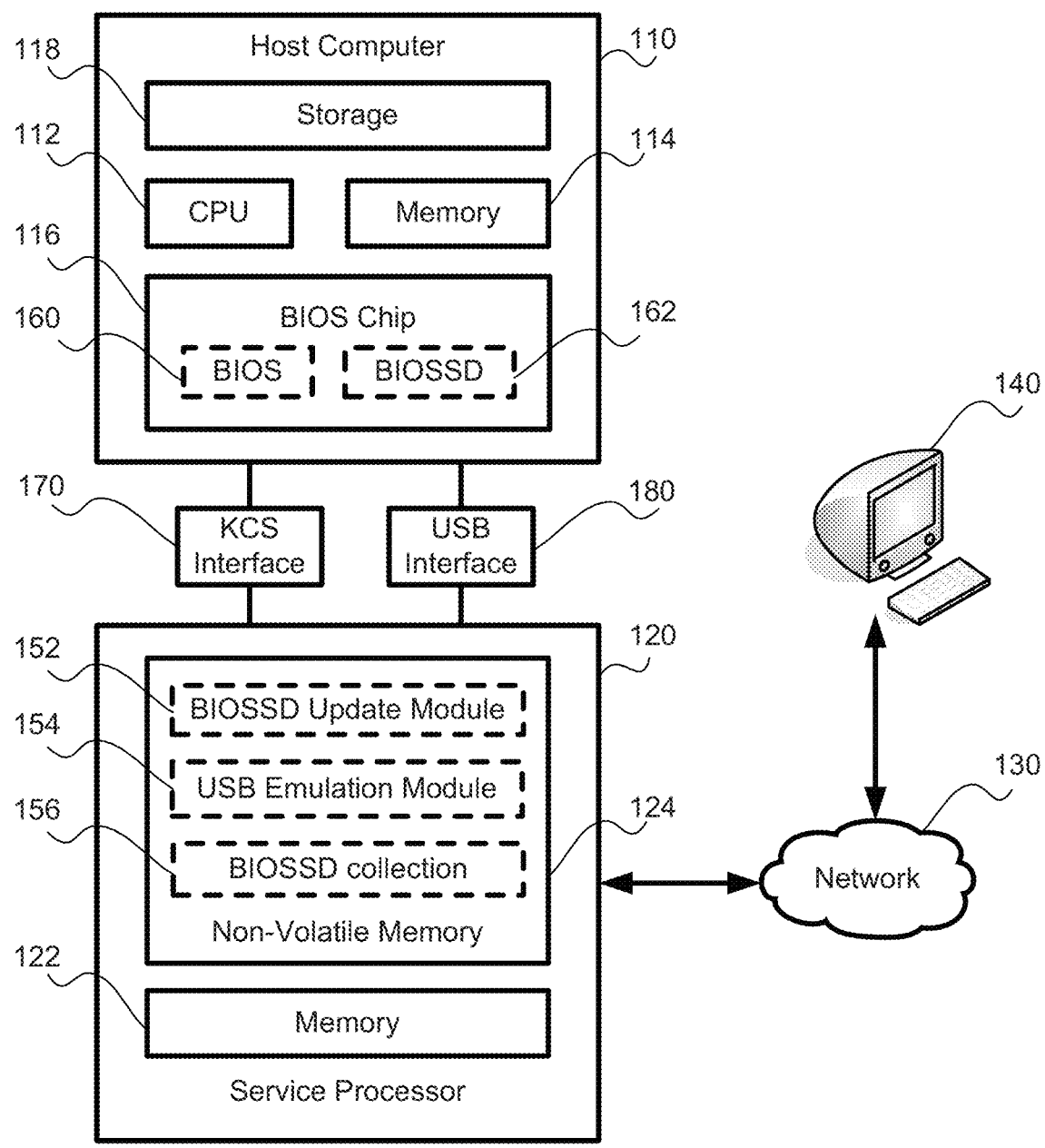
FIG. 2A schematically depicts a host computer and a service processor of the system according to certain embodiments of the present disclosure.

FIG. 2A schematically depicts a host computer and a service processor according to certain embodiments of the present disclosure. As shown in FIG. 2A, the SP 120 is connected to the host computer 110 via a keyboard controller style (KCS) interface 170 and a universal serial bus (USB) interface 180. In certain embodiments, the SP 120 may be connected to the host computer 110 via only one interface. For example, the SP 120 may be connected to the host computer 110 via the KCS interface 170 only, or via the USB interface 180 only.

The host computer 110 may be a general purpose computer system or a headless computer system. As shown in FIG. 2A, the host computer 110 includes a baseboard or the "motherboard" (not shown) and a storage 118.

The baseboard is a printed circuit board to which a multitude of components or devices may be connected by way of a system bus or other electrical communication paths. Although not explicitly shown in FIG. 2A, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a central processing unit (CPU) 112, a memory 114, a BIOS chip 116, and other required memory and Input/Output (I/O) modules (not shown). The BMC 120 may also be a component on the baseboard. In certain embodiments, the CPU 112, the memory 114, the video controller 114 and the BMC 120 may be embedded on the baseboard, or may be connected to the baseboard through an interface. In certain embodiments, the interface may be physical hardware interface such as electrical connectors, buses, ports, cables, terminals, or other I/O devices. Further, the host computer 110 includes a storage 118, which is a data storage media for storing the OS (not shown) and other applications of the host computer 110.

The CPU 112 is a host processor which is configured to control operation of the host computer 110. The host processor can execute an operating system (OS) or other applications of the host computer 110. In certain embodiments, the host computer 110 may run on or more than one CPU as the host processor, such as two CPUs, four CPUs, eight CPUs, or any suitable number of CPUs.

The memory 114 can be a volatile memory, such as the random-access memory (RAM), for storing the data and information during the operation of the host computer 110.

The BIOS chip 116 is one of the most crucial components in the host computer 110 or any computer system. In certain embodiments, the BIOS chip 116 is a non-volatile memory, such as a flash memory chip, an EEPROM chip or a complementary metal oxide semiconductor (CMOS) memory.

As shown in FIG. 2A, the BIOS chip 116 stores a BIOS software (hereinafter BIOS) 160 and a BIOS setting data (BIOSSD) 162. The BIOS 160 is configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the operating system (OS). The BIOSSD collection 162 is a BIOSSD collection that includes all data and information related to the BIOS settings.

The storage 118 is a data storage media for storing the OS (not shown) and other applications of the host computer 110. Examples of the storage 118 may include flash memory, memory cards, USB drives, hard drives, floppy disks, optical drives, or any other types of data storage devices.

In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

In certain embodiments, the CPU 112 of the host computer 110 can operate in a protected mode, which is a native operating mode of the processor, or in a system management mode (SMM). SMM is a special purpose operating mode provided for handling system-wide functions like power management, system hardware control, or proprietary OEM-designed code. It is intended for use only by system firmware, not by applications software or general-purpose systems software. The main benefit of SMM is that it offers a distinct and easily isolated processor environment that operates transparently to the operating system or executive and software applications.

In certain embodiments, SMM is entered through activation of an external system interrupt pin, which generates a system management interrupt (SMI). The external system interrupt pin is hereinafter referred to as the SMI#. In SMM, the CPU 112 switches to a separate address space while saving the context of the currently running program or task. SMM-specific code may then be executed transparently. Upon returning from SMM, the CPU 112 is placed back into its state prior to the SMI.

Figure 2B:
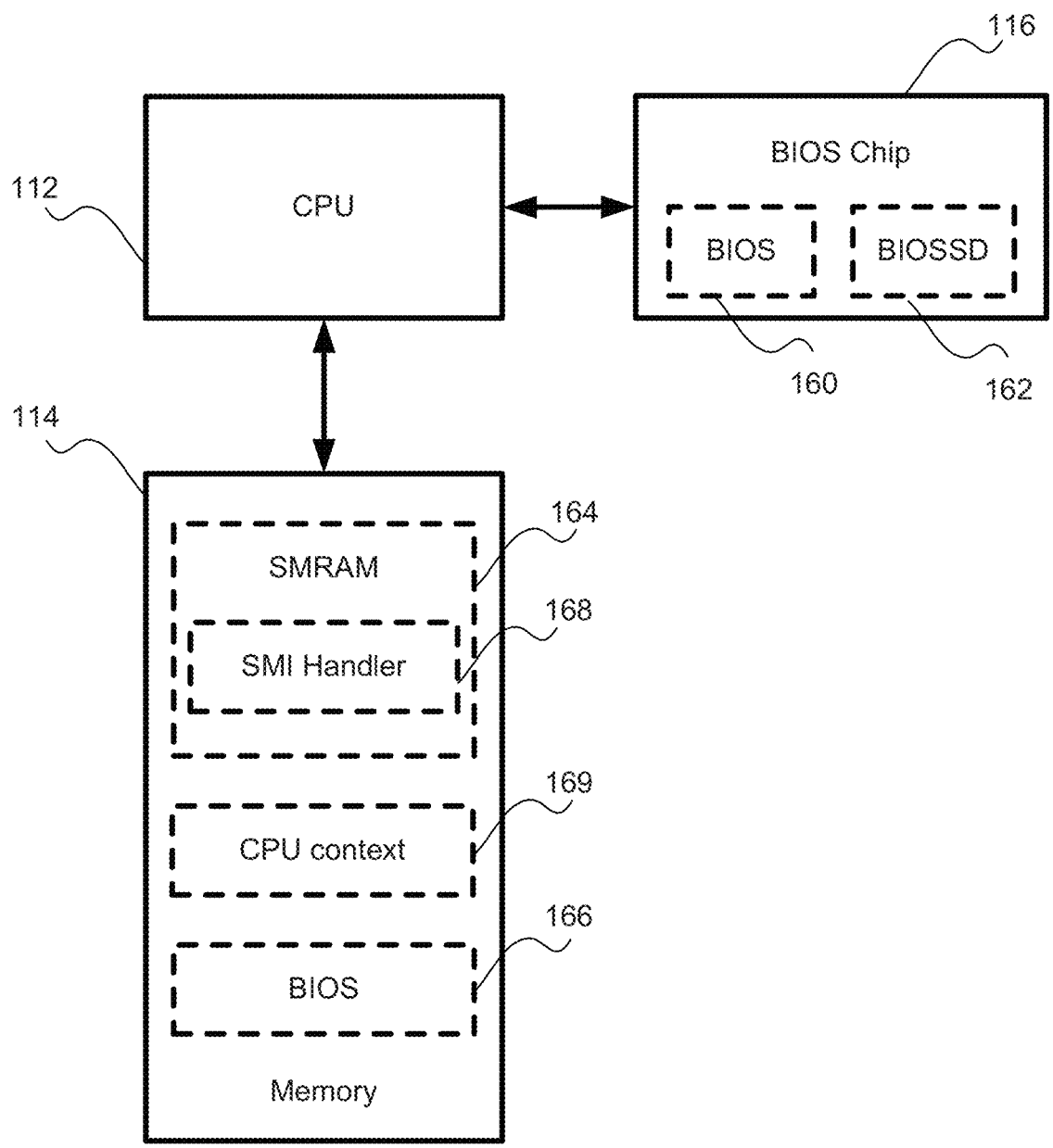
FIG. 2B schematically shows the CPU of the host computer in a system management mode (SMM) according to certain embodiments of the present disclosure.

FIG. 2B schematically shows the CPU of the host computer in the SMM according to certain embodiments of the present disclosure. As shown in FIG. 2B, the CPU 112 is in communication with the memory 114 through a system bus. The memory 114 includes a system management RAM (SMRAM) area 164, and a BIOS area 166. The SMRAM area 164 stores SMI handler codes 168, and includes a CPU context area 169.

In certain embodiments, the BIOS 160 can set up the SMM for the CPU 112. For example, when the BIOS 160 is launched, the CPU 112 loads the BIOS 160 into the BIOS area 166 and executes the BIOS 160. Further, the BIOS 160 can load the SMI handler codes 168 to the SMRAM area 164. The SMI handler 168 is configured to load some or all of the components of the BIOS 160.

When SMM is invoked through the SMI, the CPU 112 saves the current state (i.e. the context) of the processor in the CPU context area 169 of the memory 114, and switches to a separate operating environment contained in the SMRAM area 164. While in SMM, the CPU 112 loads and executes the SMI handler codes 168 to perform operations such as powering down unused disk drives or monitors, executing proprietary code, placing the whole system in a suspended state, or updating the BIOS settings in the BIOS chip 116. Specifically, the SMI handler codes 168 may include a SMM program and an SMM loader program to the area storing the SMI handler codes 168. When the CPU 112 enters the SMM and executes the SMI handler codes 168, the SMM loader program can load the SMM program into the SMRAM and then transfer control of the CPU 112 to the SMM program.

When the SMI handler has completed its operations, it executes a resume (RSM) instruction. This RSM instruction causes the CPU 112 to reload the saved context in the CPU context area 169, switch back to the protected or real mode, and resume executing the interrupted application or operating system program or task.

The SP 120 refers to a specialized microcontroller that manages the interface between system management software and platform hardware. In certain embodiments, the SP 120 may be a baseboard management controller (BMC). Thus, different types of sensors can be built into the host computer 110, and the SP 120 reads these sensors to obtain parameters such as temperature, cooling fan speeds, power status, OS status, etc.

The SP 120 monitors the sensors and can send alerts to a system administrator at the remote management computer 140 via the network 130 if any of the parameters do not stay within preset limits, indicating a potential failure of the host computer 110. The administrator can also remotely communicate with the SP 120 from the remote management computer 140 via the network 130 to take some corrective action such as resetting or power cycling the host computer 110 to get a hung OS running again.

As shown in FIG. 2A, the SP 120 includes a memory 122 and a non-volatile memory 124. The memory 122 can be a volatile memory, such as the RAM, for storing the data and information during the operation of the SP 120.

The non-volatile memory 124 stores the firmware of the SP 120. As shown in FIG. 2A, the firmware of the SP 120 includes, among other things, a BIOSSD update module 152, a USB emulation module 154 and a BIOSSD collection 156. In certain embodiments, the firmware may include a web connection module (not shown) for communication with the network 130.

The BIOSSD update module 152 controls the transmission of the BIOSSD between the SP 120 and the BIOS chip 116 via the KCS interface 170. In certain embodiments, the BIOSSD update module 152 may retrieve version information of the BIOSSD collection 156 stored in the SP 120, and the send version information of the BIOSSD collection 156 to the BIOS for comparing the version of the BIOSSD collection 162 and the BIOSSD collection 156 stored in the SP 120. If the BIOSSD collection 162 includes a newer version of settings, the BIOSSD update module 152 may receive a copy of the BIOSSD collection 162 from the BIOS chip 116 to replace the BIOSSD collection 156 in the SP 120. If the BIOSSD collection 156 includes a newer version of settings, the BIOS may send a request to the BIOSSD update module 152 for the BIOSSD collection 156, and the BIOSSD update module 152, in response to the request, sends a copy of the BIOSSD collection 156 to the BIOS chip 116 to replace the BIOSSD collection 162 stores in the BIOS chip 116. It should be noted that the operation of the BIOSSD update module 152 is independent from the state of the host computer 110. In other words, the BIOSSD update module 152 enables the OOB update of the BIOSSD collection 162 in the BIOS chip 116.

The USB emulation module 154 is a virtual module that emulates a physical USB storage device, such as a USB drive, as if it were physically attached to the USB interface 180. When the host computer 110 attempts to access the emulated USB drive, the CPU 112 of the host computer 110 instructs the USB interface 180 to access the USB emulation module 154 of the SP 120. Similarly, when the BIOS 160 is in the booting process for the host computer 110, the BIOS 160 may also instructs the USB interface 180 to access the USB emulation module 154 of the SP 120.

By emulating a virtual USB drive using the USB emulation module 154, the SP 120 may also update the BIOSSD collection 162 of the BIOS chip 116 through USB emulation. In this case, the BIOSSD collection 156 stored in the non-volatile memory 124 of the SP 120 may serve as the physical image of the USB emulation module 154. Thus, the BIOS 160 may have access to the USB emulation module 154, and compares the version of the BIOSSD collection 162 and the BIOSSD collection 156 stored in the SP 120. If the BIOSSD collection 162 includes a newer version of settings, the BIOS 160 may send a copy of the BIOSSD collection 162 from the BIOS chip 116 to the emulated USB drive to replace the BIOSSD collection 156 in the SP 120. If the BIOSSD collection 156 includes a newer version of settings, the BIOS 160 may retrieve a copy of the BIOSSD collection 156 from the emulated USB drive to replace the BIOSSD collection 162 stores in the BIOS chip 116.

The BIOSSD collection 156 is a BIOSSD collection or a copy of the BIOS settings stored in the non-volatile memory 124 of the SP 120. Generally, when the BIOSSD collection 162 stored in the BIOS chip 116 does not change, the BIOSSD collection 156 is an exact copy of the BIOSSD collection 162.

As discussed above, when the BIOSSD collection 162 includes a newer version of settings, the BIOSSD collection 156 may be updated by the BIOSSD update module 152 or the USB emulation module 154. When the BIOSSD collection 156 includes a newer version of settings, the BIOSSD update module 152 or the USB emulation module 154 may retrieve a copy of the BIOSSD collection 156 and send the copy of the BIOSSD collection 154 to the BIOS chip 116 to update the BIOSSD collection 162 in the BIOS chip 116. In certain embodiments, a user may also access the BIOSSD collection 156 remotely from the remote management computer 140 via the network 130. Specifically, a user may access the BIOSSD collection 156 in one SP 120 when the retrieve version information of the BIOSSD collection 162 of the BIOS chip 116 to compare the version of the BIOSSD collection 162 and the BIOSSD collection 156 stored in the SP 120. If the BIOSSD collection 162 includes a newer version of settings, the BIOSSD update module 152 may retrieve a copy of the BIOSSD collection 162 from the BIOS chip 116 to replace the BIOSSD collection 156 in the SP 120. If the BIOSSD collection 156 includes a newer version of settings, the BIOSSD update module 152 sends the BIOSSD collection 156 to the BIOS chip 116 to replace the BIOSSD collection 162 stores in the BIOS chip 116.

The remote management computer 140 can be a local mobile device serving as the client device of the system 100, which is subject to receive actions from the user. As shown in FIGS. 1 and 2, the remote management computer 140 is remotely connected to the SP 120 of the host computer 110 via the network 130. One of ordinary skill in the art would appreciate that the system 100 may include a plurality of remote management computer 140. Examples of the remote management computer 140 may include, for example, portable devices such as smartphones, tablets or other mobile computer devices. Although not explicitly shown in FIG. 1, the remote management computer 140 may have a baseboard with a CPU and a memory embedded thereon, a storage and at least one I/O device, such that the remote management computer 140 is operable independently without being connected to the SP 120 of the host computer 110.

The KCS interface 170 is an interface often used between a SP and a payload processor in the Intelligent Platform Management Interface (IPMI) architecture. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

In certain embodiments, a user may use IPMI original equipment manufacturer (OEM) messages to control data transmission via the KCS interface 170. Specifically, in addition to the standard predefined commands and parameters, IPMI allows OEM extensions for the manufacturers and users to define OEM specific commands. The IPMI OEM messages may be used for transmission of the BIOSSD between the BIOS chip 116 and the SP 120.

The USB interface 180 is an industry standardized interface for the connection of computer peripherals. In certain embodiments, the USB interface 180 is a USB port. As discussed above, the USB emulation module 154 of the SP 120 may emulate a USB drive, which is virtually connected to the USB interface 180. Thus, when the BIOS 160 attempts to access the emulated USB drive, the BIOS 160 instructs the USB interface 180 to access the USB emulation module 154 of the SP 120.

Figure 3:
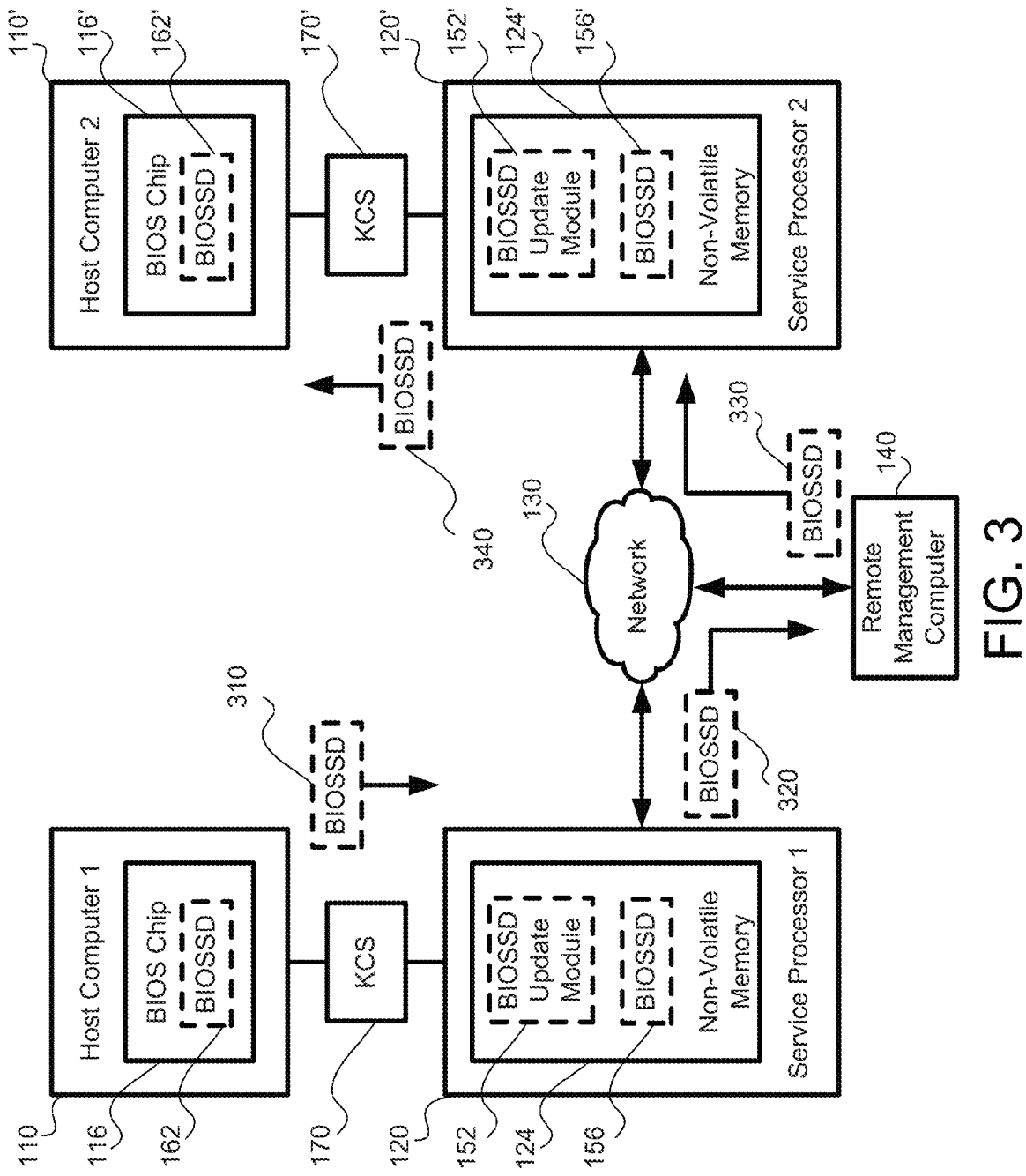
FIG. 3 schematically depicts out-of-band replicating BIOSSD across a plurality of computers through KCS interface according to certain embodiments of the present disclosure.
Figure 4A:
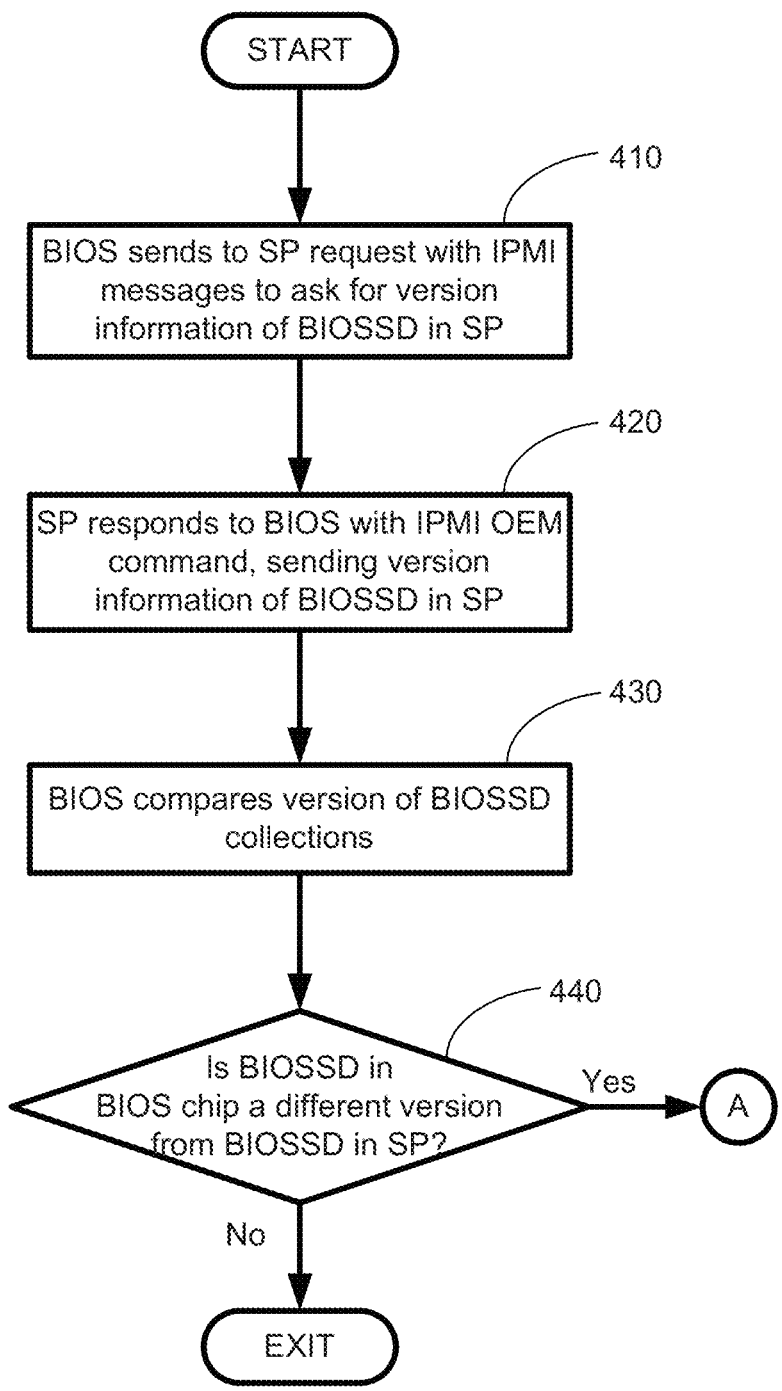
FIGS. 4A and 4B show a flowchart of the BIOSSD transmission process between the service processor and the BIOS chip of FIG. 3 according to certain embodiments of the present disclosure.
Figure 4B:
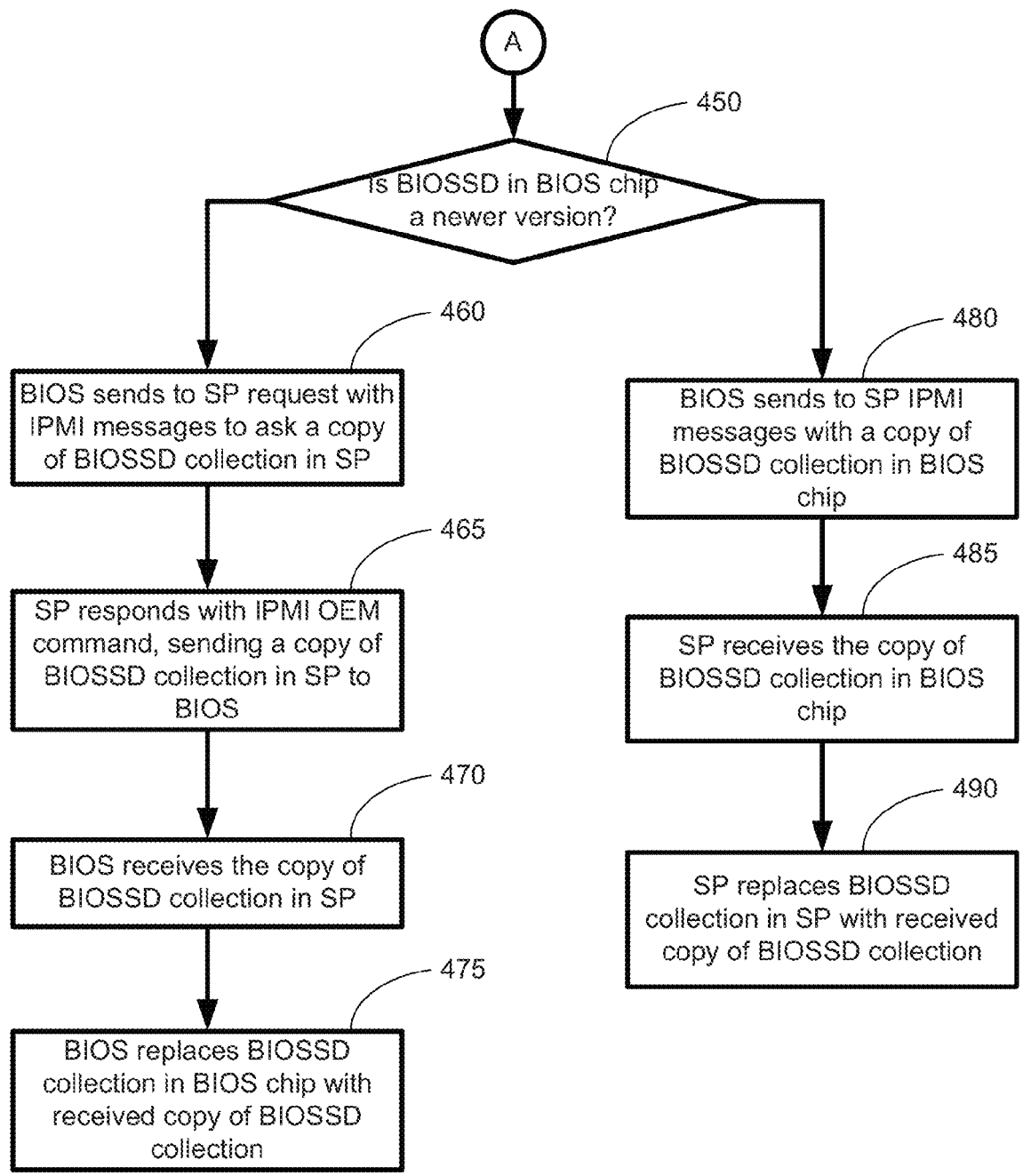

FIG. 3 schematically depicts out-of-band replicating BIOSSD across a plurality of computers through KCS interface according to certain embodiments of the present disclosure, and FIGS. 4A and 4B show a flowchart of the BIOSSD transmission process between the service processor and the BIOS chip of FIG. 3 according to certain embodiments of the present disclosure.

As shown in FIG. 3, the system 100 includes two host computers 110 and 110'. The host computer 110 is connected with a SP 120 via the KCS interface 170, and the host computer 110' is connected with a SP 120' via the KCS interface 170'. For identifying the BIOSSD data flow, the host computer 110 is hereinafter referred to as the source computer, and the host computer 110' is hereinafter referred to as the destination computer. In certain embodiments, the SP 120 controls the BIOSSD update process using IPMI OEM messages via the KCS interface 170.

During the operation of the source computer 110, the settings of the BIOSSD collection 162 of the BIOS chip 116 may be automatically changed by the booting process of the BIOS 160, or may be manually changed by a user. The changed BIOSSD collection 162 becomes a newer version of the BIOSSD, which will become effective when the BIOS 160 runs during the booting process of the source computer 110. In other words, the changed BIOSSD collection 162 becomes effective at the next booting process of the source computer 110. Since the SP 120 is already operating when the BIOS 160 initiates, the BIOSSD update between the SP 120 and the BIOS chip 116 can be done during the operation of the BIOS of the source computer 110. The BIOSSD update can also be done during the SMM as described above. The SP 120 provides the BIOSSD update module 152 as the upload/download interface of the BIOSSD, and the BIOS 160 interacts with the SP 120 to receive/send the BIOSSD and updates the setting values of the BIOSSD.

Referring to FIGS. 4A and 4B, when the BIOSSD update between the SP 120 and the BIOS chip 116 of the source computer 110 starts, the SP 120 is already operating, and the BIOSSD update module 152 has been launched.

In certain embodiments, the host computer 110 is powered up, and the CPU 112 loads and executes the BIOS 160. Then the BIOS 160 enters procedure 410.

In certain embodiments, the host computer 100 boots up and executes the OS. The OS can include a BIOSSD update program. The BIOSSD update program can initiate an SMI and trigger the CPU 112 to enter the SMM. When the CPU 112 executes in the SMM, the CPU 112 executes the SMI handler 168 stored in the SRAM area 164. The SMI handler 168, in turn, loads and executes some or all components of the BIOS 160. Then the BIOS 160 enters procedure 410.

At procedure 410, the BIOS 160 sends a request to the SP 120 via the KCS interface 170 to initiate the BIOS update process, asking for the version information of the BIOSSD collection 156 stored in the SP 120. The request can be in the format of an IPMI OEM message. At procedure 420, the BIOSSD update module 152 of the SP 120 responds to the request with an IPMI OEM message to the BIOS 160 via the KCS interface 170, sending the version information of the BIOSSD collection 156 stored in the SP 120.

Upon receiving the version information, at procedure 430, the BIOS 160 compares the versions of the BIOSSD collection 162 stored in the BIOS chip 116 and the BIOSSD collection 156 stored in the SP 120. At procedure 440, the BIOS 160 determines if the BIOSSD collection 162 is a different version from the BIOSSD collection 156. If the versions of the BIOSSD collection 162 stored in the BIOS chip 116 and the BIOSSD collection 156 stored in the SP 120 are the same, the process ends since there is no need to update the BIOSSD. In the present case, the versions of the BIOSSD collection 162 stored in the BIOS chip 116 and the BIOSSD collection 156 stored in the SP 120 are different, and the BIOS 160 enters procedure 450.

At procedure 450, the BIOS 160 determines if the BIOSSD collection 162 is a newer version than the BIOSSD collection 156. Since the BIOSSD collection 162 has been changed, the BIOS 160 determines that the BIOSSD collection 162 in the BIOS chip 116 is a newer version, and enters procedure 480.

At procedure 480, the BIOS 160 sends a request, which is in the format of the an IPMI OEM message, to the SP 120 via the KCS interface 170 with a copy (310 of FIG. 3) of the BIOSSD collection 162. At procedure 485, the BIOSSD update module 152 of the SP 120 receives the copy of the BIOSSD collection 162. In certain embodiments, the BIOSSD update module 152 stores the copy 310 of the BIOSSD collection 162 received in the memory 122 of the SP 120. Then, at procedure 490, the BIOSSD update module 152 of the SP 120 replaces the BIOSSD collection 156 in the SP 120 with the copy 310 of the BIOSSD collection 162 received from the BIOS chip 116. Thus, the BIOSSD collection 156 in the SP 120 has the same newer version of BIOS settings as the BIOSSD collection 162 in the BIOS chip 116.

Figure 5A:
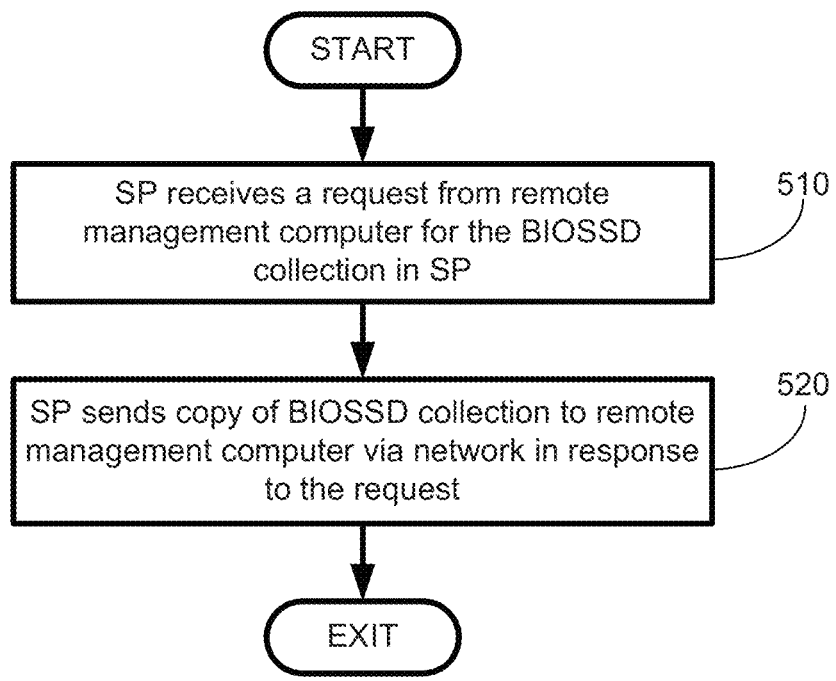
FIG. 5A shows a flowchart of transmission of BIOSSD from the service processor to the remote management computer according to certain embodiments of the present disclosure.

FIG. 5A shows a flowchart of transmission of BIOSSD from the service processor to the remote management computer according to certain embodiments of the present disclosure. As shown in FIG. 5A, at procedure 510, the SP 120 of the source computer 110 receives a request from the remote management computer 140 via the network 130 for the BIOSSD collection 156 in the SP 120. At procedure 520, the SP 120 sends a copy (320 of FIG. 3) of the BIOSSD collection 156 in the SP 120 to the remote management computer 140 via the network 130. Once the remote management computer 140 receives the BIOSSD collection 156 from the SP 120 of the source computer 110, the remote management computer 140 may send the BIOSSD collection 156 to the SP 120' of all destination computers 110'.

Figure 5B:
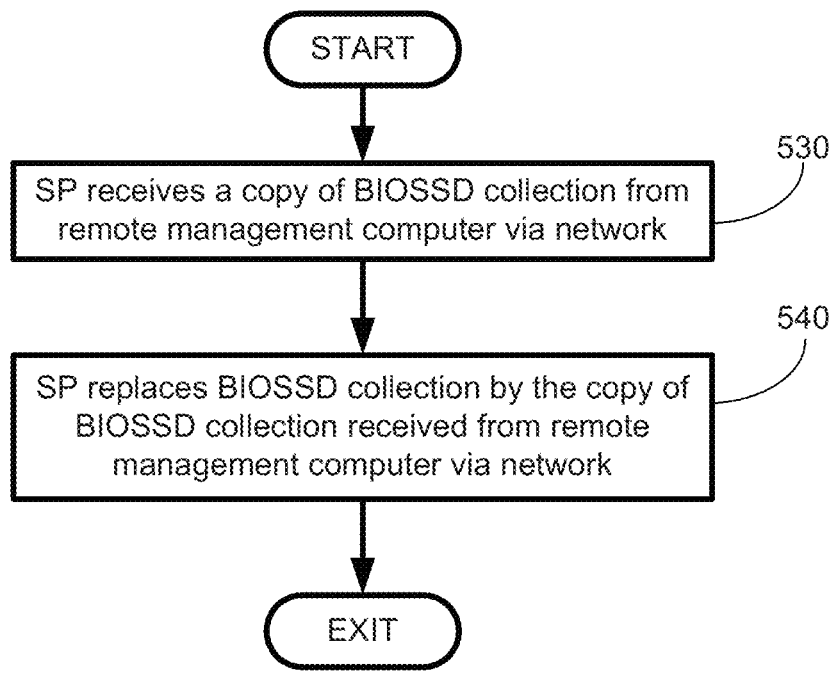
FIG. 5B shows a flowchart of transmission of BIOSSD from the remote management computer to the service processor according to certain embodiments of the present disclosure.

FIG. 5B shows a flowchart of transmission of BIOSSD from the remote management computer to the service processor according to certain embodiments of the present disclosure. At procedure 530, the SP 120' of the destination computer 110' receives a copy (330 of FIG. 3) of the BIOSSD collection from the remote management computer 140 via the network 130. At procedure 540, the SP 120' replaces the BIOSSD collection 156' by the copy 330 of the BIOSSD collection received from the remote management computer 140. In certain embodiments, the SP 120' stores the copy of BIOSSD 330 received from the remote management computer 140 in the memory 122, and replaces the BIOSSD collection 156' by the copy 330 of the BIOSSD collection stored in the memory 122.

Referring back to FIG. 4, when the BIOSSD update between the SP 120' and the BIOS chip 116' of the destination computer 110' starts, the SP 120' is already operating, and the BIOSSD update module 152' has been launched. At procedure 410, the BIOS 160' sends a request to the SP 120' via the KCS interface 170' to initiate the BIOS update process, asking for the version information of the BIOSSD collection 156' stored in the SP 120'. The request can be in the format of an IPMI OEM message. At procedure 420, the BIOSSD update module 152' of the SP 120' responds to the request with an IPMI OEM command to the BIOS 160' via the KCS interface 170', sending the version information of the BIOSSD collection 156 stored in the SP 120'. Upon receiving the version information, at procedure 430, the BIOS 160' compares the versions of the BIOSSD collection 162' stored in the BIOS chip 116' and the BIOSSD collection 156' stored in the SP 120'. At procedure 440, the BIOS 160' determines that the BIOSSD collection 162' is a different version from the BIOSSD collection 156', and enters procedure 450.

At procedure 450, the BIOS 160' determines if the BIOSSD collection 162' is a newer version than the BIOSSD collection 156'. Since the BIOSSD collection 156' is now a newer version, the BIOS 160' determines that the BIOSSD collection 162' in the BIOS chip 116' is not a newer version, and enters procedure 460.

At procedure 460, the BIOS 160' sends a request, which is in the format of an IPMI OEM message, to the SP 120' via the KCS interface 170' to ask for a copy of the BIOSSD collection 156' stored in the SP 120'. Upon receiving the request, at procedure 465, the BIOSSD update module 152' of the SP 120' responds to the request with an IPMI OEM command to the BIOS 160' via the KCS interface 170', sending a copy (340 of FIG. 3) of the BIOSSD collection 156' to the BIOS 160'. At procedure 470, the BIOS 160 receives the copy 340 of the BIOSSD collection 156' stored in the SP 120'. At procedure 475, the BIOS 160' replaces the BIOSSD collection 162' in the BIOS chip 112' with the received copy 340 of the BIOSSD collection 156'. Thus, the updated BIOSSD collection 162' at the destination computer 110' also becomes the same newer version as the BIOSSD collection 162 at the source computer 110. In the next booting process of the destination computer 110', the updated BIOSSD collection 162' will be effective.

As discussed above, the replicating process of BIOSSD across a plurality of computers through KCS interface is an OOB process. In other words, the administrator of the system may remotely perform the OOB BIOSSD replicating process independent from the current operation states of the source computer 110 and the destination computer 110'. The process can be performed even when the source computer 110 and/or the destination computer 110' are powered off.

In the embodiment of the BIOSSD update process as shown in FIGS. 4A and 4B, the BIOS 160 compares the versions of the BIOSSD collections. In certain embodiments, the comparing procedure may be performed at the SP 120. In this case, the BIOS 160 may send an IPMI OEM message to the SP 160 with the version information of the BIOSSD collection 156 stored in the BIOS chip 112. Upon receiving the version information of the BIOSSD collection 156, the BIOSSD update module 152 compares the versions of the BIOSSD collections, as described in procedures 440 and 450. Then, the BIOS 160 may send an IPMI OEM message to the SP 160, asking for the comparison result of the versions, and proceeds to procedure 460 or procedure 480 according to the comparison result.

Figure 6:
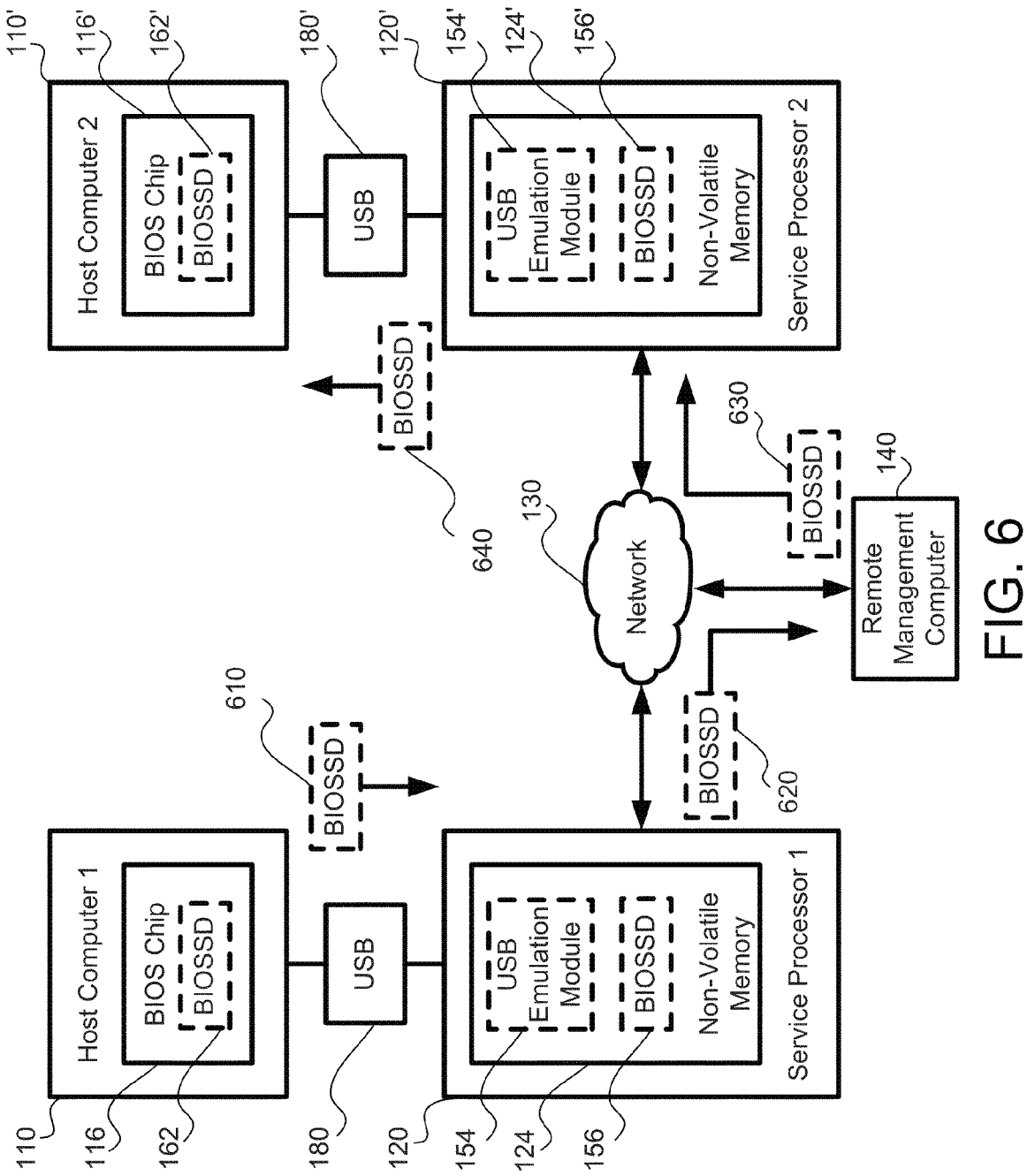
FIG. 6 schematically depicts out-of-band replicating BIOSSD across a plurality of computers through USB emulation according to certain embodiments of the present disclosure.

FIG. 6 schematically depicts out-of-band replicating BIOSSD across a plurality of computers through USB emulation according to certain embodiments of the present disclosure, and FIG. 7 shows a flowchart of the BIOSSD transmission process between the service processor and the BIOS chip of FIG. 6 according to certain embodiments of the present disclosure.

As shown in FIG. 6, the system 100 includes two host computers 110 and 110'. The host computer 110 is connected with a SP 120 via the USB interface 180, and the host computer 110' is connected with a SP 120' via the USB interface 180'. For identifying the BIOSSD data flow, the host computer 110 is hereinafter referred to as the source computer, and the host computer 110' is hereinafter referred to as the destination computer. In certain embodiments, the BIOS 160 controls the BIOSSD update process using USB emulation via the USB interface 180. The SP 120 provides the USB emulation module 154 as the upload/download interface of the BIOSSD, and the BIOS 160 interacts with the SP 120 to receive/send the BIOSSD and updates the setting values of the BIOSSD.

During the operation of the source computer 110, the settings of the BIOSSD collection 162 of the BIOS chip 116 may be automatically changed by the booting process of the BIOS 160, or may be manually changed by a user. The changed BIOSSD collection 162 becomes a newer version of the BIOSSD, which will become effective when the BIOS 160 runs during the booting process of the source computer 110. In other words, the changed BIOSSD collection 162 becomes effective at the next booting process of the source computer 110. Since the SP 120 is already operating when the BIOS 160 initiates, the BIOSSD update between the SP 120 and the BIOS chip 116 can be done during the operation of the BIOS of the source computer 110. The BIOSSD update can also be done during the SMM as described above.

Figure 7A:
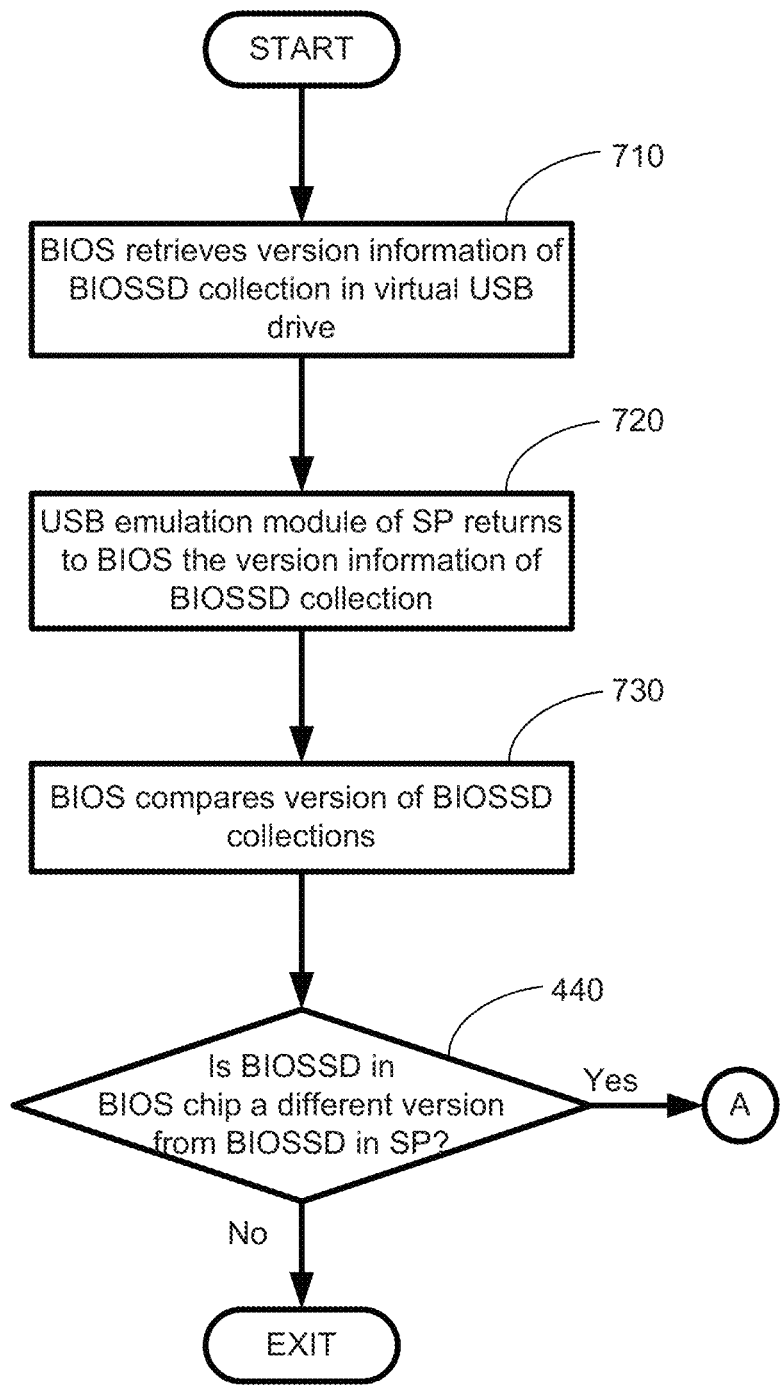
FIGS. 7A and 7B show a flowchart of the BIOSSD transmission process between the service processor and the BIOS chip of FIG. 6 according to certain embodiments of the present disclosure.
Figure 7B:
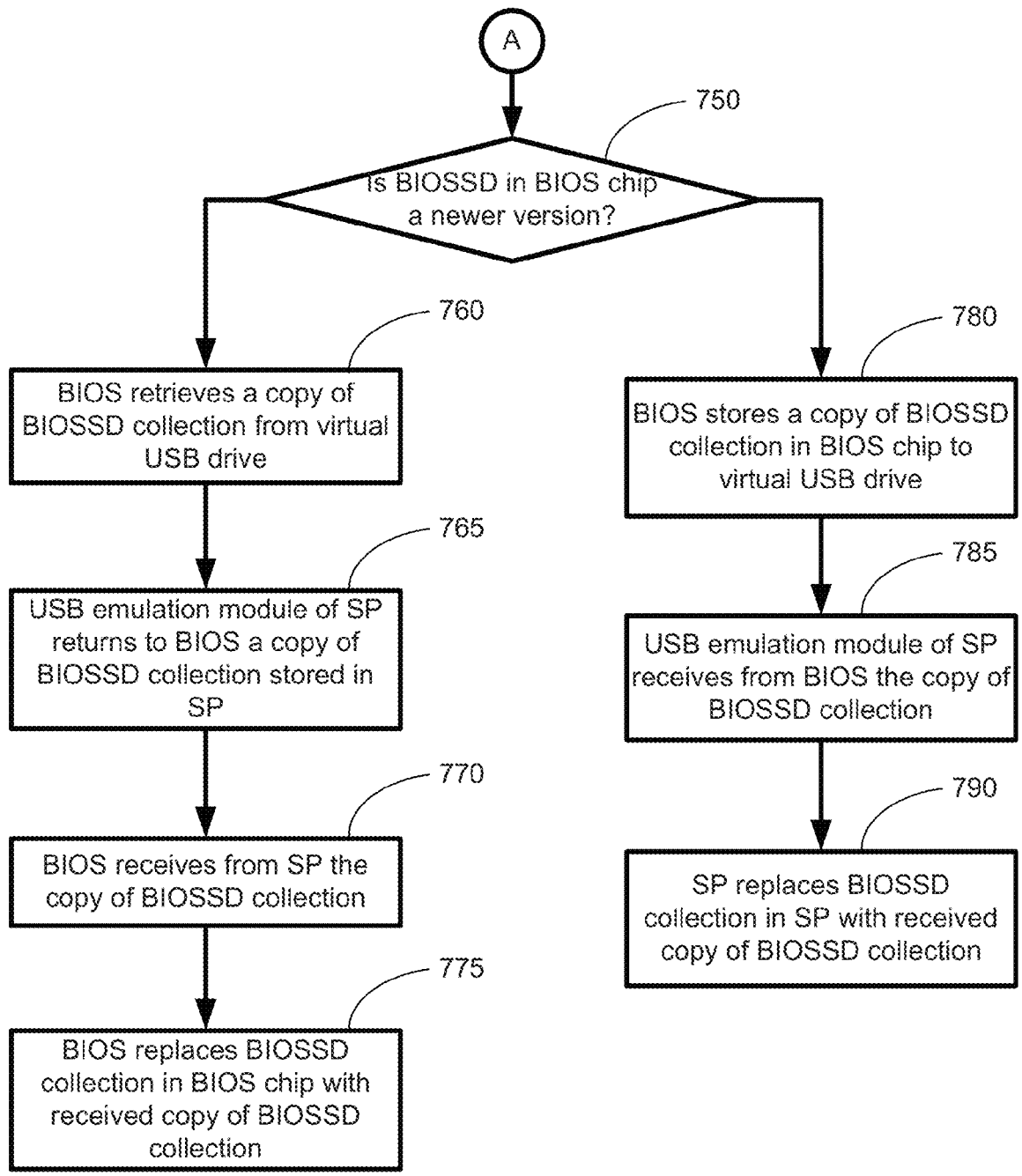

Referring to FIGS. 7A and 7B, when the BIOSSD update between the SP 120 and the BIOS chip 116 of the source computer 110 starts, the SP 120 is already operating, and the USB emulation module 154 has been launched. The BIOS 160 recognizes the USB emulation module 154 as the virtual USB drive. At procedure 710, the BIOS 160 requests to retrieve the version information of the BIOSSD collection 156 from the virtual USB drive via the USB interface 180. The request can be a typical USB data reading command. At procedure 720, in response to the retrieving request, the USB emulation module 154 returns the version information of the BIOSSD collection 156 stored in the SP 120 to the BIOS 160. Upon receiving the version information, at procedure 730, the BIOS 160 compares the versions of the BIOSSD collection 162 stored in the BIOS chip 116 and the BIOSSD collection 156 stored in the SP 120. At procedure 740, the BIOS 160 determines if the BIOSSD collection 162 is a different version from the BIOSSD collection 156. If the versions of the BIOSSD collection 162 stored in the BIOS chip 116 and the BIOSSD collection 156 stored in the SP 120 are the same, the process ends since there is no need to update the BIOSSD. In the present case, the versions of the BIOSSD collection 162 stored in the BIOS chip 116 and the BIOSSD collection 156 stored in the SP 120 are different, and the BIOS 160 enters procedure 750.

At procedure 750, the BIOS 160 determines if the BIOSSD collection 162 is a newer version than the BIOSSD collection 156. Since the BIOSSD collection 162 has been changed, the BIOS 160 determines that the BIOSSD collection 162 in the BIOS chip 116 is a newer version, and enters procedure 780.

At procedure 780, the BIOS 160 stores a copy (610 of FIG. 6) of the BIOSSD collection 162 to the virtual USB drive. At procedure 785, the USB emulation module 154 of the SP 120 receives the copy 310 of the BIOSSD collection 162. In certain embodiments, the USB emulation module 154 stores the copy 310 of the BIOSSD collection 162 received in the memory 122 of the SP 120. Then, at procedure 790, the USB emulation module 154 of the SP 120 replaces the BIOSSD collection 156 in the SP 120 with the copy 310 of the BIOSSD collection 162 received from the BIOS chip 116. Thus, the BIOSSD collection 156 in the SP 120 has the same newer version of BIOS settings as the BIOSSD collection 162 in the BIOS chip 116.

Referring back to FIG. 5A, at procedure 510, the SP 120 of the source computer 110 receives a request from the remote management computer 140 for the BIOSSD collection 156 in the SP 120 via the network 130. At procedure 520, the SP 120 sends the copy (620 of FIG. 6) of the BIOSSD collection 156 in the SP 120 to the remote management computer 140 via the network 130. Once the remote management computer 140 receives the BIOSSD collection 156 from the SP 120 of the source computer 110, the remote management computer 140 may send the BIOSSD collection 156 to the SP 120' of all destination computers 110'.

Referring to FIG. 5B, at procedure 530, the SP 120' of the destination computer 110' receives a copy (630 of FIG. 6) of the BIOSSD collection from the remote management computer 140 via the network 130. At procedure 540, the SP 120' replaces the BIOSSD collection 156' by the copy 630 of the BIOSSD collection received from the remote management computer 140. In certain embodiments, the SP 120' stores the copy 630 of the BIOSSD collection received from the remote management computer 140 in the memory 122, and replaces the BIOSSD collection 156' by the copy 630 of the BIOSSD collection stored in the memory 122.

Referring back to FIG. 7, when the BIOSSD update between the SP 120' and the BIOS chip 116' of the destination computer 110' starts, the SP 120' is already operating, and the USB emulation module 154' has been launched. At procedure 710, the BIOS 160' requests to retrieve the version information of the BIOSSD collection 156' from the virtual USB drive via the USB interface 180'. The request can be a typical USB data reading command. At procedure 720, in response to the retrieving request, the USB emulation module 154' returns the version information of the BIOSSD collection 156' stored in the SP 120' to the BIOS 160' via the USB interface 180'. Upon receiving the version information, at procedure 730, the BIOS 160' compares the versions of the BIOSSD collection 162' stored in the BIOS chip 116' and the BIOSSD collection 156' stored in the SP 120'. At procedure 440, the BIOS 160' determines that the BIOSSD collection 162' is a different version from the BIOSSD collection 156', and enters procedure 450.

At procedure 750, the BIOS 160' determines if the BIOSSD collection 162' is a newer version than the BIOSSD collection 156'. Since the BIOSSD collection 156' is now a newer version, the BIOS 160' determines that the BIOSSD collection 162' in the BIOS chip 116' is not a newer version, and enters procedure 760.

At procedure 760, the BIOS 160' requests to retrieve a copy of the BIOSSD collection 156' from the virtual USB drive via the USB interface 180'. At procedure 765, in response to the retrieving request, the USB emulation module 154' returns a copy (640 of FIG. 6) of the BIOSSD collection 156' stored in the SP 120' to the BIOS 160' via the USB interface 180'. At procedure 770, the BIOS 160 receives the copy 640 of the BIOSSD collection 156' stored in the SP 120'. At procedure 775, the BIOS 160' replaces the BIOSSD collection 162' in the BIOS chip 112' with the received copy 640 of the BIOSSD collection 156'. Thus, the updated BIOSSD collection 162' at the destination computer 110' also becomes the same newer version as the BIOSSD collection 162 at the source computer 110. In the next booting process of the destination computer 110', the updated BIOSSD collection 162' will be effective.

As discussed above, the replicating process of BIOSSD across a plurality of computers through USB interface is also an OOB process. In other words, the administrator of the system may remotely perform the OOB BIOSSD replicating process independent from the current operation states of the source computer 110 and the destination computer 110'. The process can be performed even when the source computer 110 and/or the destination computer 110' are powered off.

In the embodiment of the BIOSSD update process as shown in FIGS. 7A and 7B, the BIOS 160 compares the versions of the BIOSSD collections. In certain embodiments, the comparing procedure may be performed at the SP 120. In this case, the BIOS 160 may store the version information of the BIOSSD collection 156 stored in the BIOS chip 112 to the virtual USB drive. Upon receiving the version information of the BIOSSD collection 156, the USB emulation module 154 sends the version information of the BIOSSD collection 156 to the BIOSSD update module 152 to compare the versions of the BIOSSD collections, as described in procedures 740 and 750. Then, the BIOS 160 may retrieve the comparison result of the versions from the virtual USB drive, and the USB emulation module 154 returns the comparison result to the BIOS 160. Thus, the BIOS 160 may proceed to procedure 760 or procedure 780 according to the comparison result.

The method as described in the embodiments of the present disclosure can be used in the field of, but not limited to, OOB replicating BIOS settings across a plurality of computers in the same system. In high performance computer systems that include a plurality of computers, the method provides a quick path for BIOSSD changes to be made across the plurality of computers.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for replicating BIOS setting data (BIOSSD) across computers, comprising:
   a plurality of computers, each comprising a BIOS chip, wherein the BIOS chip stores a first BIOSSD collection;
   a plurality of service processors (SP's), each connecting to one of the plurality of computers via an interface, each SP comprising a processor and a non-volatile memory storing computer executable codes and a second BIOSSD collection; and
   a remote management computer connected to the plurality of SP's via a network;
   wherein the codes are configured, when executed at the processor, to
      when the first BIOSSD collection is newer than the second BIOSSD collection, receive a copy of the first BIOSSD collection from the BIOS chip through the interface, and replace the second BIOSSD collection with the copy of the first BIOSSD collection received from the BIOS chip;
      when the second BIOSSD collection is newer than the first BIOSSD collection, transmit a copy of the second BIOSSD collection to the BIOS chip through the interface to replace the first BIOSSD collection in the BIOS chip;
      in response to a request for from the remote management computer, transmit the copy of the second BIOSSD collection to the remote management computer via the network; and
      receive a copy of a third BIOSSD collection from the remote management computer via the network, and replace the second BIOSSD collection with the copy of the third BIOSSD collection.

2. The system as claimed in claim 1, wherein the BIOS chip stores a BIOS, configured to compare version information of the first BIOSSD collection and the second BIOSSD collection to determine whether the first BIOSSD collection is newer or not newer than the second BIOSSD collection.

3. The system as claimed in claim 1, wherein the interface is a keyboard controller style (KCS) interface.

4. The system as claimed in claim 3, wherein the codes comprise a BIOSSD update module, configured to
   when the first BIOSSD collection is newer than the second BIOSSD collection, receive the copy of the first BIOSSD collection from the BIOS chip through the KCS interface, and replace the second BIOSSD collection with the copy of the first BIOSSD collection received from the BIOS chip; and
   when the second BIOSSD collection is newer than the first BIOSSD collection, transmit the copy of the second BIOSSD collection to the BIOS chip through the KCS interface to replace the first BIOSSD collection in the BIOS chip.

5. The system as claimed in claim 4, wherein the BIOSSD update module is configured to receive a first Intelligent Platform Management Interface (IPMI) original equipment manufacturer (OEM) message from the BIOS chip, wherein the first IPMI OEM message comprises a version request for version information of the second BIOSSD collection; and in response to the version request, send a second IPMI OEM message to the BIOS chip, wherein the second IPMI OEM message comprises the version information of the second BIOSSD collection.

6. The system as claimed in claim 5, wherein the BIOSSD update module is further configured to when the first BIOSSD collection is newer than the second BIOSSD collection, receive a third IPMI OEM message from the BIOS chip, wherein the third IPMI OEM message comprises the copy of the first BIOSSD collection from the BIOS chip, and replace the second BIOSSD collection with the copy of the first BIOSSD collection in the third IPMI OEM message; and when the second BIOSSD collection is newer than the first BIOSSD collection, receive a fourth IPMI OEM message from the BIOS chip, wherein the fourth IPMI OEM message comprises a copy request for the copy of the second BIOSSD collection, and in response to the copy request, transmit a fifth IPMI OEM message to the BIOS chip, wherein the fifth IPMI OEM message comprises the copy of the second BIOSSD collection.

7. The system as claimed in claim 1, wherein the interface is a universal serial bus (USB) interface.

8. The system as claimed in claim 7, wherein the codes comprise a USB emulation module configured to emulate a virtual USB drive corresponding to the second BIOSSD collection stored in the non-volatile memory of the SP.

9. The system as claimed in claim 8, wherein the USB emulation module is configured to:

receive, from the BIOS chip, a version request to retrieve the version information of the second BIOSSD collection of the virtual USB drive; and in response to the version request, send the version information of the second BIOSSD collection to the BIOS chip.

10. The system as claimed in claim 9, wherein the USB emulation module is further configured to:

when the first BIOSSD collection is newer than the second BIOSSD collection, receive, from the BIOS chip, a copy of the first BIOSSD collection to be stored in the virtual USB drive, and replace the second BIOSSD collection with the copy of the first BIOSSD collection received from the BIOS chip; and when the second BIOSSD collection is newer than the first BIOSSD collection, receive, from the BIOS chip, a retrieving request for the copy of the second BIOSSD collection from the virtual USB drive, and in response to the retrieving request, transmit a the copy of the second BIOSSD collection to the BIOS chip.

11. The system as claimed in claim 1, wherein the SP is a baseboard management controller (BMC).

12. A service processor (SP) connected to a computer via an interface, wherein the computer comprises a BIOS chip, and the BIOS chip stores a first BIOS setting data (BIOSSD) collection, the SP comprising:

a processor; and a non-volatile memory storing computer executable codes and a second BIOSSD collection, wherein the codes are configured, when executed at the processor, to when the first BIOSSD collection is newer than the second BIOSSD collection, receive a copy of the first BIOSSD collection from the BIOS chip through the interface, and replace the second BIOSSD collection with the copy of the first BIOSSD collection received from the BIOS chip;

when the BIOSSD collection is newer than a first BIOSSD collection stored in a BIOS chip of a computer connected to the SP via an interface, transmit a copy of the second BIOSSD collection to the BIOS chip through the interface to replace the first BIOSSD collection in the BIOS chip;

in response to a request for from a remote management computer connected to the SP via a network, transmit the copy of the second BIOSSD collection to the remote management computer via the network; and receive a copy of a third BIOSSD collection from the remote management computer via the network, and replace the second BIOSSD collection with the copy of the third BIOSSD collection.

13. The SP as claimed in claim 12, wherein the interface is a keyboard controller style (KCS) interface.

14. The SP as claimed in claim 13, wherein the codes comprises a BIOSSD update module, configured to when the first BIOSSD collection is newer than the second BIOSSD collection, receive the copy of the first BIOSSD collection from the BIOS chip through the KCS interface, and replace the second BIOSSD collection with the copy of the first BIOSSD collection received from the BIOS chip; and when the second BIOSSD collection is newer than the first BIOSSD collection, transmit the copy of the second BIOSSD collection to the BIOS chip through the KCS interface to replace the first BIOSSD collection in the BIOS chip.

15. The SP as claimed in claim 14, wherein the BIOSSD update module is configured to receive a first Intelligent Platform Management Interface (IPMI) original equipment manufacturer (OEM) message from the BIOS chip, wherein the first IPMI OEM message comprises a version request for version information of the second BIOSSD collection;

in response to the version request, send a second IPMI OEM message to the BIOS chip, wherein the second IPMI OEM message comprises the version information of the second BIOSSD collection;

when the first BIOSSD collection is newer than the second BIOSSD collection, receive a third IPMI OEM message from the BIOS chip, wherein the third IPMI OEM message comprises the copy of the first BIOSSD collection from the BIOS chip, and replace the second BIOSSD collection with the copy of the first BIOSSD collection in the third IPMI OEM message; and when the second BIOSSD collection is newer than the first BIOSSD collection, receive a fourth IPMI OEM message from the BIOS chip, wherein the fourth IPMI OEM message comprises a copy request for the copy of the second BIOSSD collection, and in response to the copy request, transmit a fifth IPMI OEM message to the BIOS chip, wherein the fifth IPMI OEM message comprises the copy of the second BIOSSD collection.

16. The SP as claimed in claim 12, wherein the interface is a universal serial bus (USB) interface.

17. The SP as claimed in claim 16, wherein the firmware comprises a USB emulation module configured to emulate a virtual USB drive corresponding to the second BIOSSD collection stored in the non-volatile memory of the SP.

18. The SP as claimed in claim 17, wherein the USB emulation module is configured to:

receive, from the BIOS chip, a version request to retrieve the version information of the second BIOSSD collection of the virtual USB drive;

in response to the version request, send the version information of the second BIOSSD collection to the BIOS chip;

when the first BIOSSD collection is newer than the second BIOSSD collection, receive, from the BIOS chip, a copy of the first BIOSSD collection to be stored in the virtual USB drive, and replace the second BIOSSD collection with the copy of the first BIOSSD collection received from the BIOS chip; and when the second BIOSSD collection is newer than the first BIOSSD collection, receive, from the BIOS chip, a retrieving request for the copy of the second BIOSSD collection from the virtual USB drive, and in response to the retrieving request, transmit a the copy of the second BIOSSD collection to the BIOS chip.

19. The SP as claimed in claim 12, being a baseboard management controller (BMC).

20. A computer, comprising:
a BIOS chip, storing a BIOS and a first BIOS setting data (BIOSSD) collection; and
an interface; and
a service processor (SP) connected to the computer via the interface, the SP comprising a processor and a non-volatile memory storing computer executable codes and a second BIOSSD collection, wherein the codes are configured, when executed at the processor, to
when the first BIOSSD collection is newer than the second BIOSSD collection, receive a copy of the first BIOSSD collection from the BIOS chip through the interface, and replace the second BIOSSD collection with the copy of the first BIOSSD collection received from the BIOS chip;
when the BIOSSD collection is newer than a first BIOSSD collection stored in a BIOS chip of a computer connected to the SP via an interface, transmit a copy of the second BIOSSD collection to the BIOS chip through the interface to replace the first BIOSSD collection in the BIOS chip;
in response to a request for from a remote management computer connected to the SP via a network, transmit the copy of the second BIOSSD collection to the remote management computer via the network; and
receive a copy of a third BIOSSD collection from the remote management computer via the network, and replace the second BIOSSD collection with the copy of the third BIOSSD collection.

21. The computer as claimed in claim 20, wherein the interface is a keyboard controller style (KCS) interface.

22. The computer as claimed in claim 21, wherein the codes comprises a BIOSSD update module, configured to
when the first BIOSSD collection is newer than the second BIOSSD collection, receive the copy of the first BIOSSD collection from the BIOS chip through the KCS interface, and replace the second BIOSSD collection with the copy of the first BIOSSD collection received from the BIOS chip; and
when the second BIOSSD collection is newer than the first BIOSSD collection, transmit the copy of the second BIOSSD collection to the BIOS chip through the KCS interface to replace the first BIOSSD collection in the BIOS chip.

23. The computer as claimed in claim 22, wherein the BIOSSD update module is configured to
receive a first Intelligent Platform Management Interface (IPMI) original equipment manufacturer (OEM) message from the BIOS chip, wherein the first IPMI OEM message comprises a version request for version information of the second BIOSSD collection;
in response to the version request, send a second IPMI OEM message to the BIOS chip, wherein the second IPMI OEM message comprises the version information of the second BIOSSD collection;
when the first BIOSSD collection is newer than the second BIOSSD collection, receive a third IPMI OEM message from the BIOS chip, wherein the third IPMI OEM message comprises the copy of the first BIOSSD collection from the BIOS chip, and replace the second BIOSSD collection with the copy of the first BIOSSD collection in the third IPMI OEM message; and
when the second BIOSSD collection is newer than the first BIOSSD collection, receive a fourth IPMI OEM message from the BIOS chip, wherein the fourth IPMI OEM message comprises a copy request for the copy of the second BIOSSD collection, and in response to the copy request, transmit a fifth IPMI OEM message to the BIOS chip, wherein the fifth IPMI OEM message comprises the copy of the second BIOSSD collection.

24. The computer as claimed in claim 20, wherein the interface is a universal serial bus (USB) interface.

25. The computer as claimed in claim 24, wherein the firmware comprises a USB emulation module configured to emulate a virtual USB drive corresponding to the second BIOSSD collection stored in the non-volatile memory of the SP.

26. The computer as claimed in claim 25, wherein the USB emulation module is configured to:
receive, from the BIOS chip, a version request to retrieve the version information of the second BIOSSD collection of the virtual USB drive;
in response to the version request, send the version information of the second BIOSSD collection to the BIOS chip;
when the first BIOSSD collection is newer than the second BIOSSD collection, receive, from the BIOS chip, a copy of the first BIOSSD collection to be stored in the virtual USB drive, and replace the second BIOSSD collection with the copy of the first BIOSSD collection received from the BIOS chip; and
when the second BIOSSD collection is newer than the first BIOSSD collection, receive, from the BIOS chip, a retrieving request for the copy of the second BIOSSD collection from the virtual USB drive, and in response to the retrieving request, transmit a the copy of the second BIOSSD collection to the BIOS chip.

27. The computer as claimed in claim 20, wherein the SP is a baseboard management controller (BMC).

* * * * *